US011627451B2

(12) United States Patent
Musa et al.

(10) Patent No.: US 11,627,451 B2
(45) Date of Patent: Apr. 11, 2023

(54) RAIL OPERATING SYSTEM

(71) Applicant: T-Worx Holdings, LLC, Sterling, VA (US)

(72) Inventors: Jeffrey R. Musa, Leesburg, VA (US); Wayne J. Taylor, Ashburn, VA (US); Gary W. Callsen, Ashburn, VA (US); Tyler J. Miller, Dickerson, MD (US); Joseph D. Ellena, Herndon, VA (US); Benjamin F. Feldman, Reston, VA (US)

(73) Assignee: T-Worx Holdings, LLC, Sterling, VA (US)

( * ) Notice: Subject to any disclaimer, the term of this patent is extended or adjusted under 35 U.S.C. 154(b) by 0 days.

(21) Appl. No.: 16/746,762

(22) Filed: Jan. 17, 2020

(65) Prior Publication Data

US 2021/0084471 A1    Mar. 18, 2021

Related U.S. Application Data

(60) Provisional application No. 62/794,951, filed on Jan. 21, 2019.

(51) Int. Cl.
*H04W 4/70* (2018.01)
*H04W 4/029* (2018.01)
*F41A 19/01* (2006.01)
*F41G 11/00* (2006.01)

(52) U.S. Cl.
CPC .............. *H04W 4/70* (2018.02); *F41A 19/01* (2013.01); *F41G 11/003* (2013.01); *H04W 4/029* (2018.02)

(58) Field of Classification Search
CPC ......... F41A 19/01; H04W 4/70; H04W 4/029; F41H 13/00; F41C 27/00; F41G 11/003; F41G 3/06
See application file for complete search history.

(56) References Cited

U.S. PATENT DOCUMENTS

| | | | |
|---|---|---|---|
| 6,415,542 B1 * | 7/2002 | Bates | F41A 17/06 42/70.05 |
| 7,255,035 B2 * | 8/2007 | Mowers | F41J 5/10 89/41.05 |
| 7,509,766 B2 | 3/2009 | Vasquez | |

(Continued)

FOREIGN PATENT DOCUMENTS

WO       2018011537 A1    1/2018

OTHER PUBLICATIONS

International Searching Authority; PCT International Search Report and Written Opinion; dated Apr. 21, 2020; 19 pages.

(Continued)

*Primary Examiner* — Joshua E Freeman
(74) *Attorney, Agent, or Firm* — Merchant & Gould P.C.

(57) ABSTRACT

A system for interoperating and communicating data from a device having a communications gateway and at least one tactical device connected to an electrified rail providing electrical power. The system includes at least one processor, and at least one non-transitory computer-readable data storage device storing data instructions that, when executed by the at least one processor, cause the system to receive an event from the device, determine whether the event triggers a workflow, and execute an action on the device in response to the workflow being triggered.

17 Claims, 12 Drawing Sheets

(56) References Cited

U.S. PATENT DOCUMENTS

| | | | | |
|---|---|---|---|---|
| 7,627,975 B1* | 12/2009 | Hines | F41G 11/003 | 42/84 |
| 8,297,173 B1* | 10/2012 | Teetzel | F41G 3/165 | 89/41.17 |
| 8,726,556 B1* | 5/2014 | Willingham | G08B 21/0261 | 42/70.11 |
| 9,404,698 B2* | 8/2016 | Stewart | E05B 45/005 | |
| 9,710,836 B1* | 7/2017 | O'Malley | G06Q 30/0607 | |
| 9,752,840 B1* | 9/2017 | Betro | F41A 17/06 | |
| 9,885,530 B2* | 2/2018 | Houde-Walter | G08B 15/001 | |
| 10,323,894 B2* | 6/2019 | Imbriano | F41A 9/65 | |
| 2004/0099134 A1* | 5/2004 | Gotfried | F41A 17/066 | 89/1.11 |
| 2006/0250499 A1* | 11/2006 | Regebro | F41A 33/02 | 348/113 |
| 2008/0032268 A1* | 2/2008 | Farrell | F41A 17/06 | 434/16 |
| 2008/0039962 A1* | 2/2008 | McRae | G01S 17/88 | 700/90 |
| 2008/0040965 A1* | 2/2008 | Solinsky | F41G 1/345 | 42/90 |
| 2008/0083344 A1* | 4/2008 | Deguire | F42B 33/00 | 102/262 |
| 2010/0031552 A1* | 2/2010 | Houde-Walter | F41C 23/16 | 42/72 |
| 2010/0083553 A1* | 4/2010 | Montgomery | F41C 27/00 | 42/84 |
| 2010/0192443 A1* | 8/2010 | Cabahug | F41C 23/16 | 42/71.02 |
| 2010/0192444 A1* | 8/2010 | Cabahug | F41G 11/003 | 42/71.02 |
| 2010/0218410 A1* | 9/2010 | Cabahug | F41G 11/003 | 42/71.01 |
| 2010/0279544 A1* | 11/2010 | Dodd | F41C 23/22 | 439/533 |
| 2011/0000120 A1* | 1/2011 | Thompson | F41G 11/003 | 42/84 |
| 2011/0025491 A1* | 2/2011 | Cazanas | F41A 19/01 | 340/539.1 |
| 2011/0061284 A1* | 3/2011 | Cabahug | F41C 27/00 | 42/73 |
| 2011/0173865 A1* | 7/2011 | Compton | F41G 11/003 | 42/84 |
| 2011/0252684 A1* | 10/2011 | Ufer | F41A 19/01 | 42/1.03 |
| 2012/0131837 A1* | 5/2012 | Cabahug | F41C 27/00 | 42/84 |
| 2012/0144716 A1* | 6/2012 | Cabahug | F41C 27/00 | 42/84 |
| 2012/0192476 A1* | 8/2012 | Compton | F41G 11/003 | 42/84 |
| 2013/0185978 A1* | 7/2013 | Dodd | F41C 23/22 | 42/84 |
| 2014/0110482 A1* | 4/2014 | Bay | F41G 1/44 | 235/404 |
| 2014/0283429 A1 | 9/2014 | Sullivan et al. | | |
| 2014/0360077 A1* | 12/2014 | Miller | F41C 27/00 | |
| 2014/0378088 A1* | 12/2014 | Goel | H04W 12/02 | 455/404.2 |
| 2015/0041538 A1* | 2/2015 | Teetzel | F41G 11/003 | 235/404 |
| 2015/0113851 A1* | 4/2015 | Bensayan | F41A 17/063 | 42/117 |
| 2015/0285599 A1* | 10/2015 | Downing | H04W 4/02 | 89/1.11 |
| 2015/0300786 A1* | 10/2015 | Downing | F41G 3/02 | 235/404 |
| 2016/0025462 A1* | 1/2016 | Downing | F41G 11/003 | 89/1.11 |
| 2016/0033234 A1* | 2/2016 | Swift | F41G 11/003 | 42/75.01 |
| 2016/0216082 A1* | 7/2016 | Downing | F41G 3/06 | |
| 2016/0377383 A1* | 12/2016 | Downing | F41G 9/00 | 42/111 |
| 2017/0010062 A1* | 1/2017 | Black | G01S 5/0027 | |
| 2017/0010073 A1* | 1/2017 | Downing | F41G 3/165 | |
| 2017/0122706 A1* | 5/2017 | Masarik | F41G 11/003 | |
| 2017/0370679 A1 | 12/2017 | Willmann et al. | | |
| 2018/0010882 A1* | 1/2018 | Soltys | F41C 27/00 | |
| 2018/0164076 A1* | 6/2018 | Steenson, Jr. | F42C 17/04 | |
| 2018/0328698 A1* | 11/2018 | Miller | F41C 27/00 | |
| 2019/0002128 A1* | 1/2019 | Raz | B64C 39/024 | |
| 2019/0293375 A1* | 9/2019 | Urwin-Wright | G01V 3/10 | |
| 2020/0109905 A1* | 4/2020 | Black | G08B 15/004 | |
| 2020/0141700 A1* | 5/2020 | Moseman | F41G 11/003 | |
| 2020/0355457 A1* | 11/2020 | Deng | G01S 19/34 | |

OTHER PUBLICATIONS

European Patent Office, Extended European Search Report for Application No. 20745953.8 dated Sep. 28, 2022, 7 pages.

* cited by examiner

RAIL OPERATING SYSTEM

CROSS-REFERENCE TO RELATED APPLICATIONS

This application claims priority to U.S. Provisional Patent Application No. 62/794,951, filed Jan. 21, 2019, the disclosure of which is hereby incorporated by reference in its entirety.

BACKGROUND

Devices can be attached to a firearm to improve the situational awareness of the firearm user. For example, devices such as tactical lights, infrared laser pointers, cameras configured to capture still images and high-definition video, laser range finders, infrared sensors, displays, radios, and the like can be mounted to the rail of a firearm to improve the situational awareness of the firearm user. Each of these devices may operate independently or in combination with other devices to aid the firearm user in the field of operation.

SUMMARY

The present disclosure relates generally to a Rifle Operating System (ROS), or alternatively, a rail operating system (ROS), that integrates a user with a secured network to provide an array of software applications and data to the user and their chain of command, and thereby improve the user's lethality, safety, and command and control while in the field of operation. In one aspect, the ROS provides the ability to send commands and receive events from a plurality of devices in a field of operation, and to cascade the events recorded from the devices into actions internal to a proprietary system or external to other linked systems.

In one aspect, a system interoperates and communicates data from a device having a communications gateway and at least one tactical device connected to an electrified rail providing electrical power. The system includes at least one processor, and at least one non-transitory computer-readable data storage device storing data instructions that, when executed by the at least one processor, cause the system to receive an event from the device, determine whether the event triggers a workflow, and execute an action on the device in response to the workflow being triggered.

In another aspect, a method for commanding personnel from a remote location comprises: receiving data indicating a firearm position; determining whether a change in the firearm position triggers a workflow; and in response to triggering a workflow, executing one or more actions including sending a command to the firearm to record data.

A variety of additional aspects will be set forth in the description that follows. The aspects can relate to individual features and to a combination of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 1:
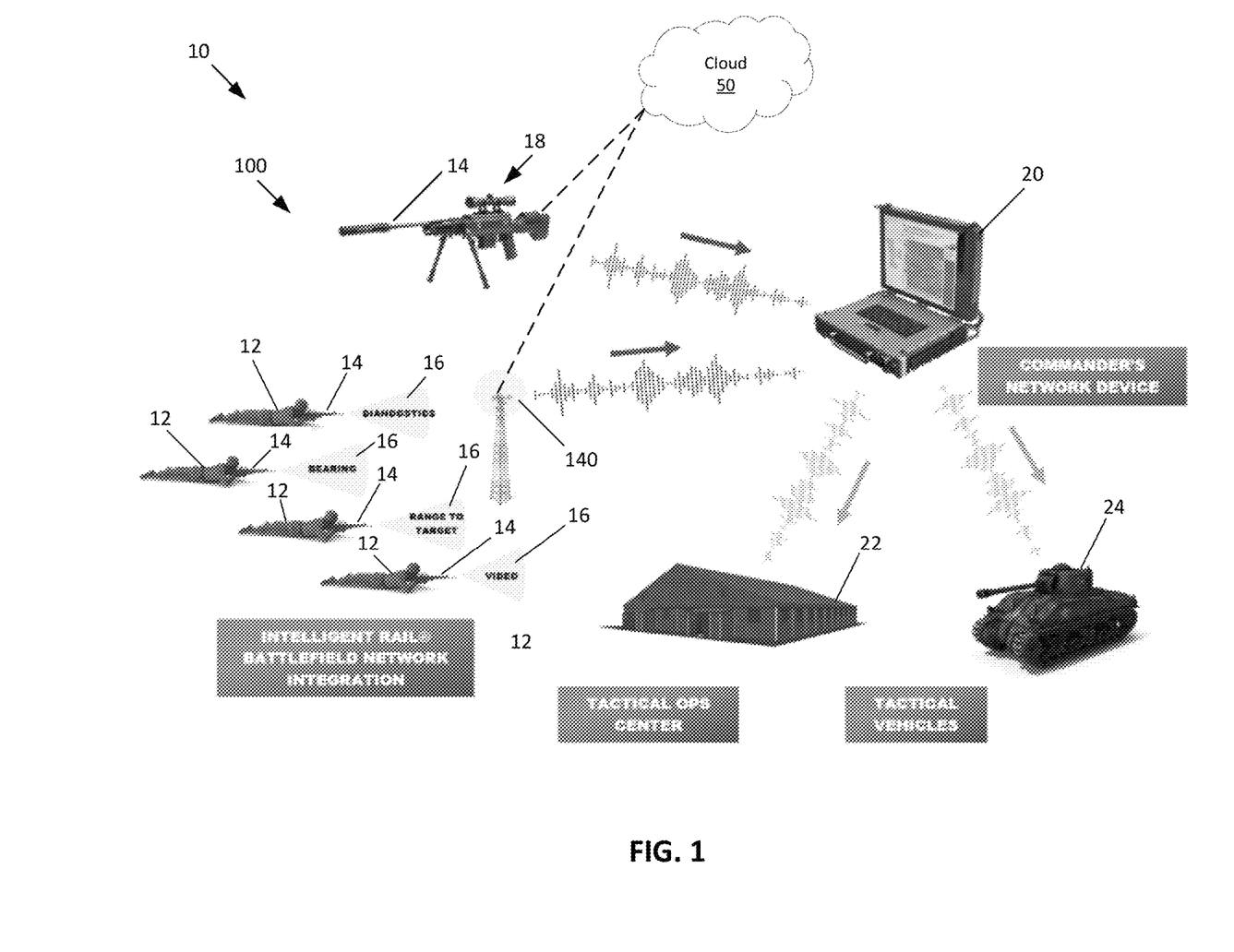
FIG. 1 illustrates an exemplary field of operation where a Rail Operating System (ROS) in accordance with the present disclosure is utilized.

FIG. 1 illustrates an exemplary field of operation 10 where a Rifle Operating System (ROS), or alternatively, a rail operating system (ROS) 100 in accordance with the present disclosure is utilized. As shown in FIG. 1, trained personnel 12 are deployed in the field of operation 10. In this example, the trained personnel 12 are soldiers. In other scenarios, the trained personnel 12 include additional armed forces such as Navy SEALs, law enforcement such as police officers, FBI agents, and SWAT team members, and armed guards such as security and body guards. Additional trained personnel 18, such as a sniper, may also be deployed in the field of operation 10 to provide further tactical advantage.

The trained personnel 12, 18 are each armed with a firearm 14 such as a carbine assault rifle. Although the ROS 100 is described with reference to military-style firearms, such as the firearms 14 depicted in FIG. 1, the ROS 100 may be used with other weapons including both military and non-military firearms, including both rifles and handguns. Additionally, the ROS 100 may be used on additional devices having an electrified rail including drones, robots, and other types of unmanned vehicles that can be equipped with or without a weapon system.

The ROS 100 is an extensible, layered platform that allows each firearm 14 to become a "smart" device that participates in the field of operation 10 as an active network node. The ROS 100 provides device management, message passing, data streaming, remote commands, accessory introspection, local data storage, device position/action, and/or geotagging for each firearm 14 deployed in the field of operation 10.

As shown in FIG. 1, data 16 collected from one or more tactical devices mounted to each firearm 14 is transmitted by a communications gateway 140 to a mobile device 20. The data 16 collected from each firearm 14 is also transmitted by the communications gateway 140 to either a local mobile device 20, an edge based computing device, or a cloud 50. In this manner, the ROS 100 allows both communication using a local network topology as well as a backhaul up to the cloud 50 for integration with a cloud platform 26 (see FIG. 2).

The data 16 may include, for example, positional, discrete events, sensor, image, and/or video data. In the example, the mobile device 20 transmits the data 16 to a tactical operations center 22 or to assets 24 such as tactical vehicles deployed in the field of operation 10 where the data 16 can be used for tactical advantage. Alternatively, the data 16 can be pushed off the firearms 14 to the cloud 50 where the data 16 is accessible by the tactical operations center 22 or the assets 24. Additional networking topologies can be used. The data 16 is network agnostic and can travel across any available IP based network.

The ROS 100 utilizes the data 16 pushed off the firearms 14 to integrate the firearms 14 with situational awareness applications thereby integrating the trained personnel 12, firearms 14, tactical operations center 22, and assets 24 together. The situational awareness applications provided by the ROS 100 to the trained personnel 12 improves the lethality, safety, and command and control of the trained personnel 12 in the field of operation 10.

Figure 2:
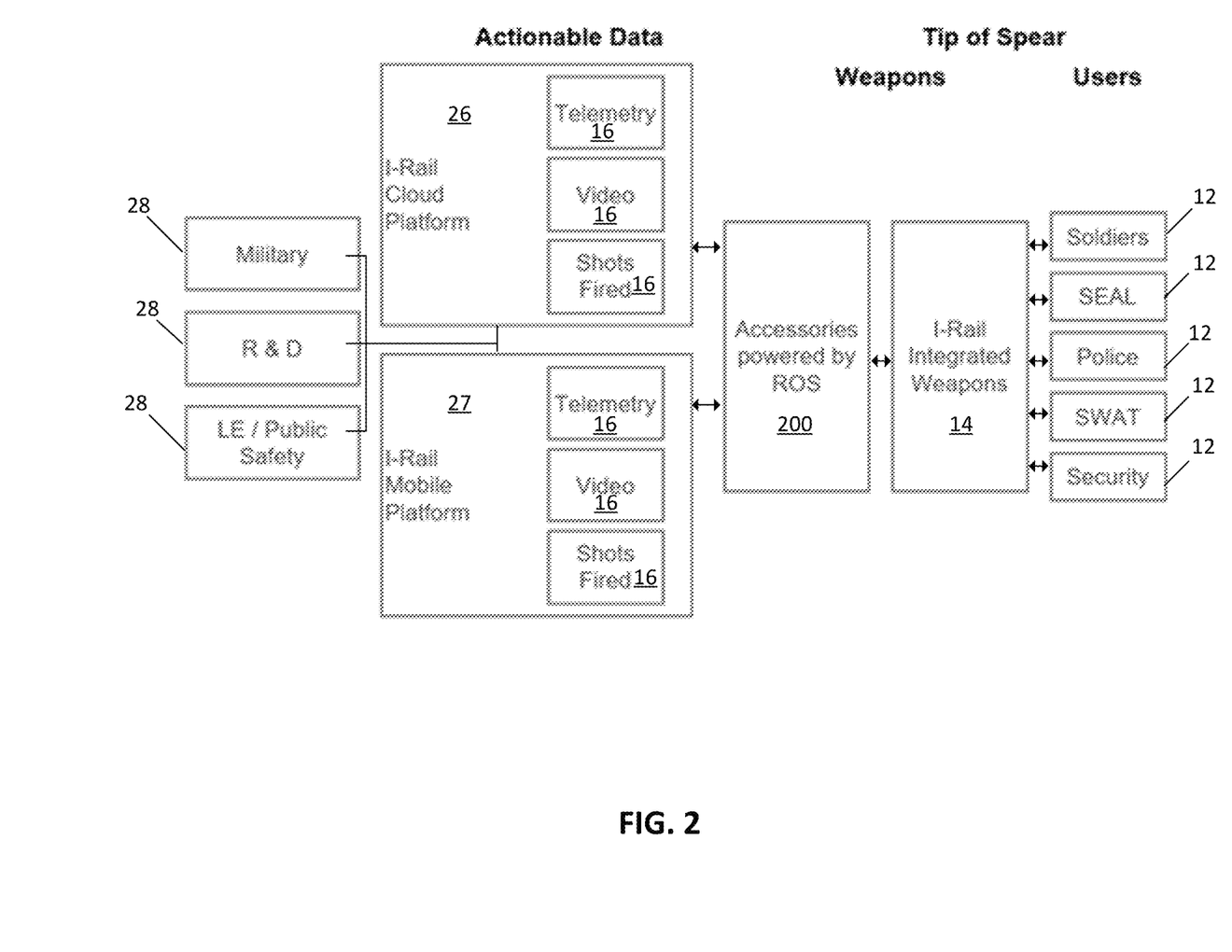
FIG. 2 schematically illustrates operational use of the ROS.

FIG. 2 schematically illustrates an exemplary operational use of the ROS 100. As shown in FIG. 2, trained personnel 12 including members of the armed forces such as soldiers and Navy SEALs, law enforcement such as police officers, FBI agents, and SWAT team members, and armed guards such as security and body guards are deployed.

The trained personnel 12 are each armed with a firearm 14 that includes an electrified rail. The electrified rail (which will be described in more detail) is connectable with one or more tactical devices 200. Each tactical device 200 is powered by the ROS 100.

The one or more tactical devices 200 are each configured to capture data 16 such as positional, sensor, image, and video data. The data 16 may also include information such as whether a shot has been fired by the firearm 14, and if so, information such as how many shots were fired, when the shots were fired, and even the desired target of the shots, etc.

As shown in FIG. 2, the data 16 is transmitted to the platforms 26, 27 that are accessible by one or more entities 28 such as the military, research and development teams, law enforcement, and public safety entities. The platforms 26, 27 process the data 16 for analysis and action by the entities 28 such that the data 16 can be used for strategic support of the trained personnel 12 present in the field of operation and located away from the entities 28. New data events are easily supported by ROS 100.

In the example depicted in FIG. 2, the data 16 is transmitted to different platforms that are accessible by the one or more entities 28. For example, the data 16 can be transmitted to a cloud platform 26 on the cloud 50 (see FIG. 1). Alternatively, the data 16 can be transmitted to a mobile platform 27 on the mobile device 20 (see FIG. 1).

Figure 3:
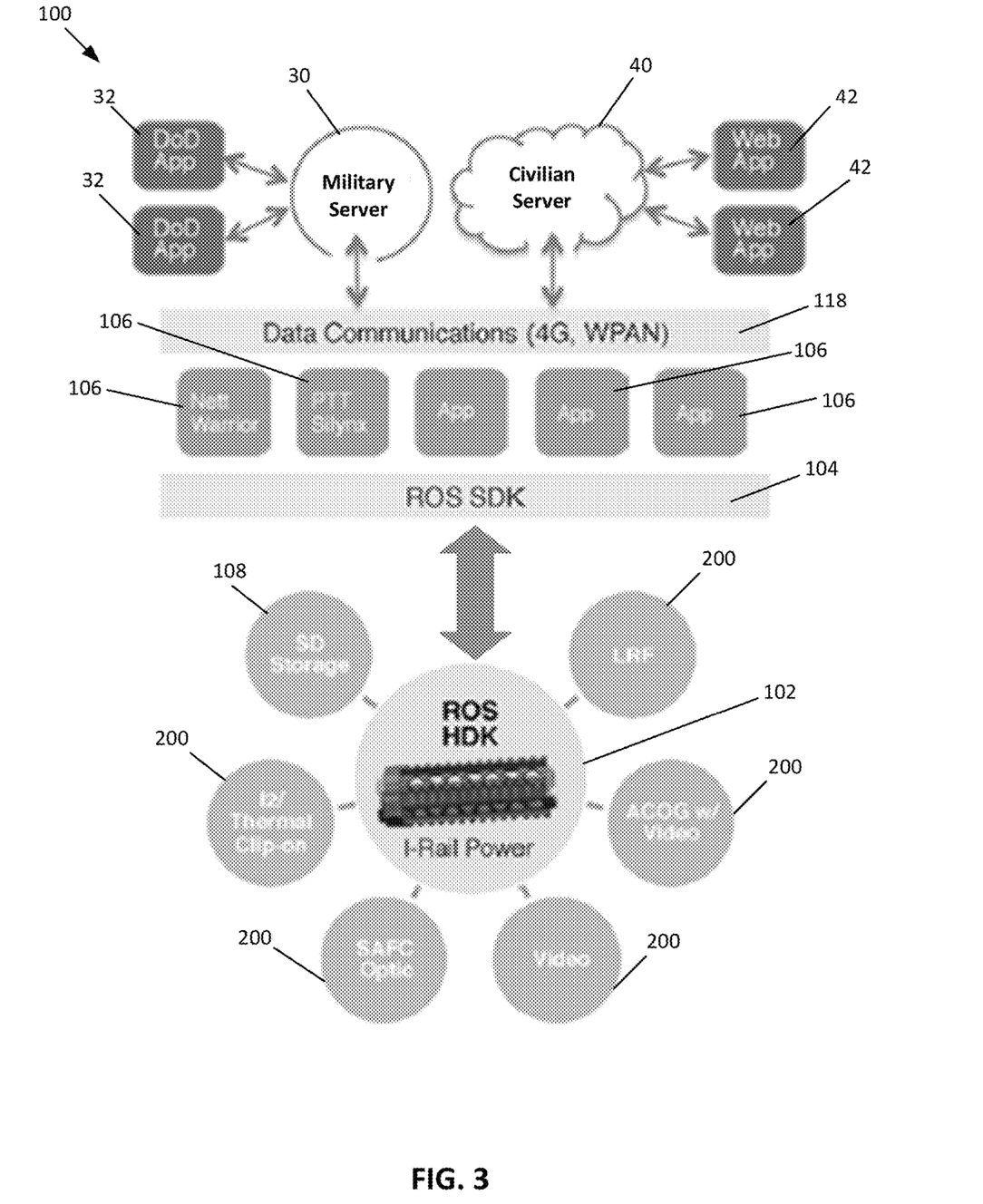
FIG. 3 schematically illustrates an architecture of the ROS.

FIG. 3 schematically illustrates an architecture of the ROS 100. The ROS 100 includes hardware development kit (HDK) 102 that mounts to a firearm 14. One or more tactical devices 200 are connected to the HDK 102. Examples of the tactical devices 200 include range finders, laser pointers, scopes, flashlights, video cameras, thermal imagers, etc.

As further shown in FIG. 3, a memory 108 that stores a software development kit (SDK) 104 is also connected to the HDK 102. The SDK 104 may include binary executable code, libraries, configuration files, scripts, and the like. In one example, the memory 108 is a non-volatile memory card such as eNVM, flash memory, or Secure Digital (SD) card. Additional types of non-volatile memory storage devices may also be utilized with the HDK 102.

The SDK 104 includes one or more applications 106 that are configured to communicate with the tactical devices 200 connected to the HDK 102. The applications 106 are local applications with respect to each firearm 14 on which the HDK 102 is mounted. Applications 106 are customized to the desired behavior and are programmed externally and loaded on to the tactical devices 200. The applications 106 process and transmit data to the tactical devices 200 and receive data from the tactical devices 200. In some examples, the applications 106 are situational awareness applications.

The data communications network 118 connects the one or more applications 106 on the firearm to one or more remote servers such as a military command server 30 or a civilian command server 40. In some examples, the data communications network 118 is a cellular network such as a 4G or 5G cellular network, or a wireless personal area network (WPAN), or a military field radio. Additional types of networks may be utilized.

The military command server 30 includes one or more military-dedicated command applications 32 including the cloud platform 26 while the civilian command server 40 includes one or more civilian-dedicated command applications 42 including the cloud platform 26. The command applications 32, 42 are remote applications with respect to each firearm 14 on which the HDK 102 is mounted.

Data from the command servers 30, 40 is transmitted through the data communications network 118 to the applications 106 on the firearms 14 (see FIG. 1), while data collected from the applications 106 on the firearms 14 is transmitted through the data communications network 118 to the command servers 30, 40 where it can be accessed by the military-dedicated command applications 32 or civilian-dedicated command applications 42. The ROS 100 allows a commander located in the tactical operations center 22 to use the command applications 32, 42 for command and control of the trained personnel 12, 18 deployed in the field of operation 10.

Figure 4:
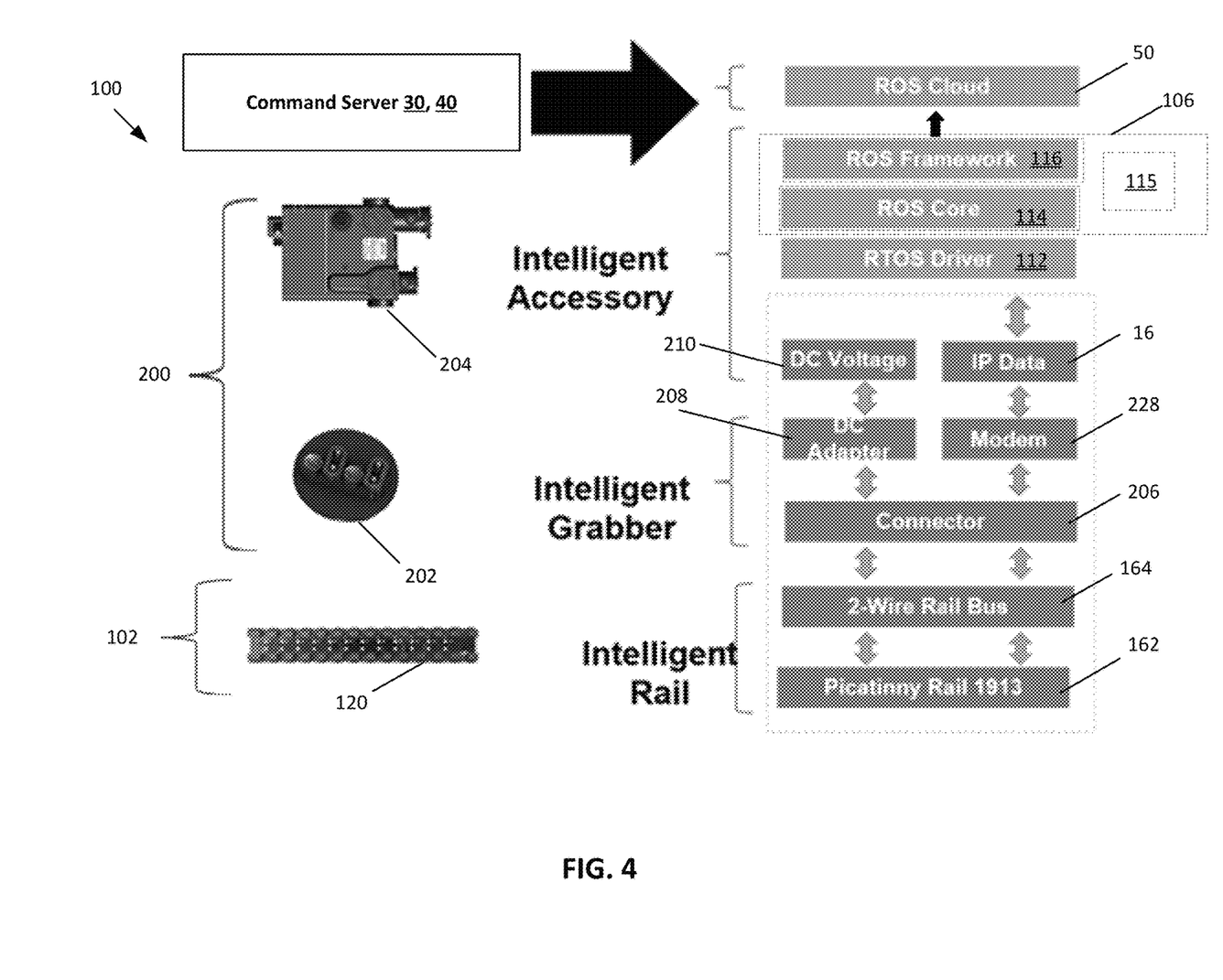
FIG. 4 illustrates an operational hierarchy of the ROS.

FIG. 4 illustrates an operational hierarchy of the ROS 100. As shown in FIG. 4, the HDK 102 includes an electrified rail 120. The electrified rail 120 includes components similar to those described in U.S. Pat. No. 9,285,185, filed on Mar. 18, 2013, the entirety of which is hereby incorporated by reference. The electrified rail 120 includes a Picatinny rail 166 also known as a MIL-STD-1913 rail or STANAG 4694 rail that provides a mechanical mounting platform for the tactical devices 200 to mount to the firearm 14. The electrified rail 120 also includes a 2-wire rail bus 164 that supplies a DC voltage 210 to power the tactical device 200. The 2-wire rail bus 164 includes similar components described in U.S. patent application Ser. No. 15/980,512, filed on May 15, 2018, the entirety of which is hereby incorporated by reference. The 2-wire rail bus 164 supplies power (e.g., DC voltage 210) and shares the data 16 between tactical devices when mounted to the electrified rail 120.

Each tactical device 200 includes a rail grabber 202 and an accessory 204. The rail grabber 202 includes a connector 206 that mechanically mounts the tactical device 200 to the Picatinny rail 166 and that also electrically connects the tactical device 200 to the 2-wire rail bus 164. The connector 206 includes components similar to those described in U.S. patent application Ser. No. 12/689,436, filed on Jan. 19, 2010, the entirety of which is hereby incorporated by reference. The rail grabber 202 includes a DC adapter 208 to convert the DC voltage 210 supplied from the 2-wire rail bus 164 to power the accessory 204

The accessory 204 provides functionality to the tactical device 200. For example, where the tactical device 200 is a video camera, the accessory 204 is configured to record a video stream. The accessory 204 may also include one or more sensors that detect an event such as one indicating an engagement of the firearm 14. For example, the sensors may detect when the firearm 14 has been moved from a position pointing vertically down, and hence in an inactive position, to a position pointing horizontally forward which indicates that the weapon is in an active position.

A processing device 228 interoperates the tactical device 200 with other tactical devices on the electrified rail 120 by using the ROS 100 to share the data 16 between the tactical devices. For example, the processing device 228 utilizes a communication protocol and real time operating system (RTOS) driver 112 to reliably and securely share the data 16 between tactical devices mounted on the electrified rail 120.

Additionally, an application 106 is shown as having an ROS core command and control 114 and an ROS application framework 116 which are described in more detail with reference to FIG. 10. The ROS core command and control 114 defines a set of application programming interfaces (APIs) and the ROS application framework 116 provides an overall skeletal structure for the APIs that can be used along with custom logic 115 for application development. The application 106 can be stored locally in a memory of the tactical device 200 or in the memory 108 of FIG. 3.

The ROS 100 enables the tactical device 200 to communicate with the remote command servers 30, 40, and thereby allow the firearm to become an active smart node in the field of operation 10. The ROS 100 enables the tactical device 200 to transfer the data 16 to a communications gateway 140 (see FIGS. 7 and 9) attached to the electrified rail 120. The communications gateway 140 pushes the data 16 off the firearm 14 and utilizes the data communications network 118 to transfer the data 16 to the command servers 30, 40 through the cloud 50, or alternatively to a mobile device 20 (see FIG. 1).

The ROS 100 enables the tactical device 200 to receive data through the communications gateway 140 from the command servers 30, 40, or the mobile device 20, that can be used by one or more applications 106 stored locally on the firearm 14 (see FIG. 3).

In the example depicted in FIG. 4, the ROS 100 communicates with the command servers 30, 40 through the cloud 50 such that the application 106 is on the cloud platform 26 of FIG. 2. In other examples, the application 106 can be on the mobile platform 27 of FIG. 2.

The ROS 100 interoperates the tactical device 200 with the command servers 30, 40, and also with other tactical devices connected to the electrified rail 120 by sharing the data 16 between the tactical devices such as commands and controls, configurations, software updates, and sensor data. The ROS 100 also enables remote operation of the tactical device 200 by the command servers 30, 40.

Figure 5:
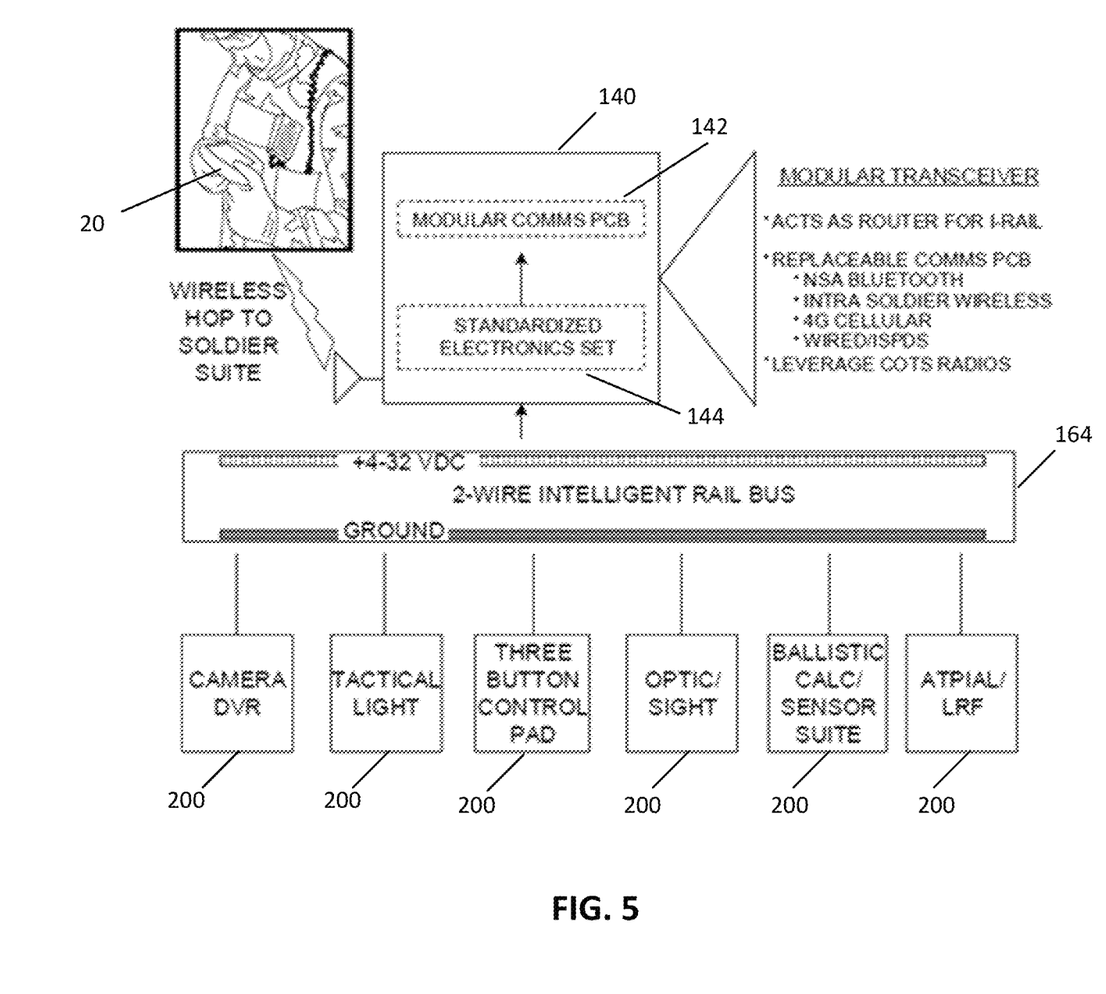
FIG. 5 schematically illustrates a communications interface between a mobile device and a plurality of tactical devices.

FIG. 5 illustrates the communications gateway 140 that communicates data between the plurality of tactical devices 200 and the mobile device 20. The communications gateway 140 is a core accessory 130 of the electrified rail 120 (see FIGS. 7 and 9). In one aspect, the communications gateway 140 is configured as a modular transceiver that connects to the 2-wire rail bus 164 of the electrified rail 120.

The plurality of tactical devices 200 are electrically connected to the 2-wire rail bus 164. As described above, the 2-wire rail bus 164 supplies power and shares data between the tactical devices 200. The 2-wire rail bus 164 also supplies power to the communications gateway 140, and shares data between the tactical devices 200 and the communications gateway 140.

The communications gateway 140 transmits the data from the tactical devices 200 to a mobile device 20, and also receives data from the mobile device 20 that can be used by the tactical devices 200. The communications gateway 140 includes a printed circuit board 142 and an electronics set 144 that interfaces with the 2-wire rail bus 164. The communications gateway 140 can utilize a variety of radios that communicate both short and long range.

Referring now to FIGS. 3 and 5, the mobile device 20 uses the data communications network 118 to transfer the data to the command servers 30, 40. As described above, the data communications network 118 is a cellular network such as a 4G or 5G cellular network, or a wireless personal area network (WPAN) or a military field radio network, or a new network technology that supports IP. The mobile device 20 can transmit the data directly to the command servers 30, 40. Alternatively, the mobile device can transmit the data indirectly to the command servers 30, 40 through the cloud 50 accessible by the command servers.

In the example shown in FIG. 5, the communications gateway 140 transfers data to the command servers 30, 40 through the mobile device 20, and receives commands from the command servers 30, 40 through the mobile device 20. In this example, the mobile device 20 utilizes the data communications network 118 which in some examples is a cellular network.

Alternatively, the communications gateway 140 can transfer data directly to the command servers 30, 40, and can receive commands directly from the command servers 30, 40 without using the mobile device 20. In this alternative example, the communications gateway 140 is equipped with a radio for long distance communications. Thus, the communications gateway 140 can bypass the mobile device 20 and route the data from the tactical devices 200 directly through a long range network such as the data communications network 118. In such examples, the communications gateway 140 can be equipped with a radio transceiver that utilizes 4G, 5G, battlefield network, or similar communications technologies.

Figure 6:
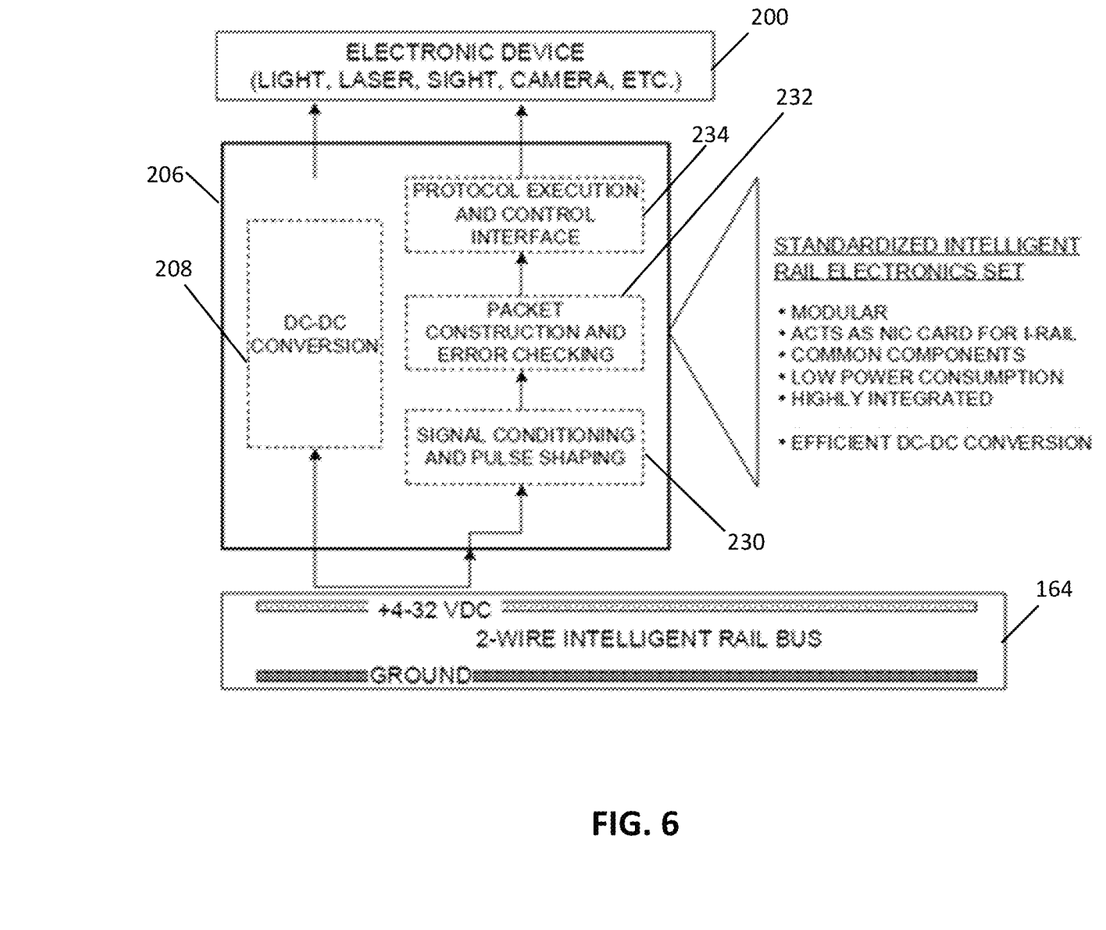
FIG. 6 illustrates an interface between a tactical device and an electrified rail.

FIG. 6 schematically illustrates the connector 206. As shown in FIG. 6, the connector 206 electrically connects a tactical device 200 with the 2-wire rail bus 164. The connector 206 includes the DC adapter 208 to convert the DC voltage 210 supplied from the 2-wire rail bus 164 to power the tactical device 200. The connector 206 further includes a signal conditioning and pulse shaping module 230, a packet construction and error checking module 232, and a protocol execution and control interface 234 to transmit the data from the 2-wire rail bus 164 for use by the tactical device 200. The data can include data from other tactical devices connected to the 2-wire rail bus 164 of the electrified rail 120, or can include data from the command servers 30, 40 obtained by the communications gateway 140 connected to the 2-wire rail bus 164.

Figure 7:
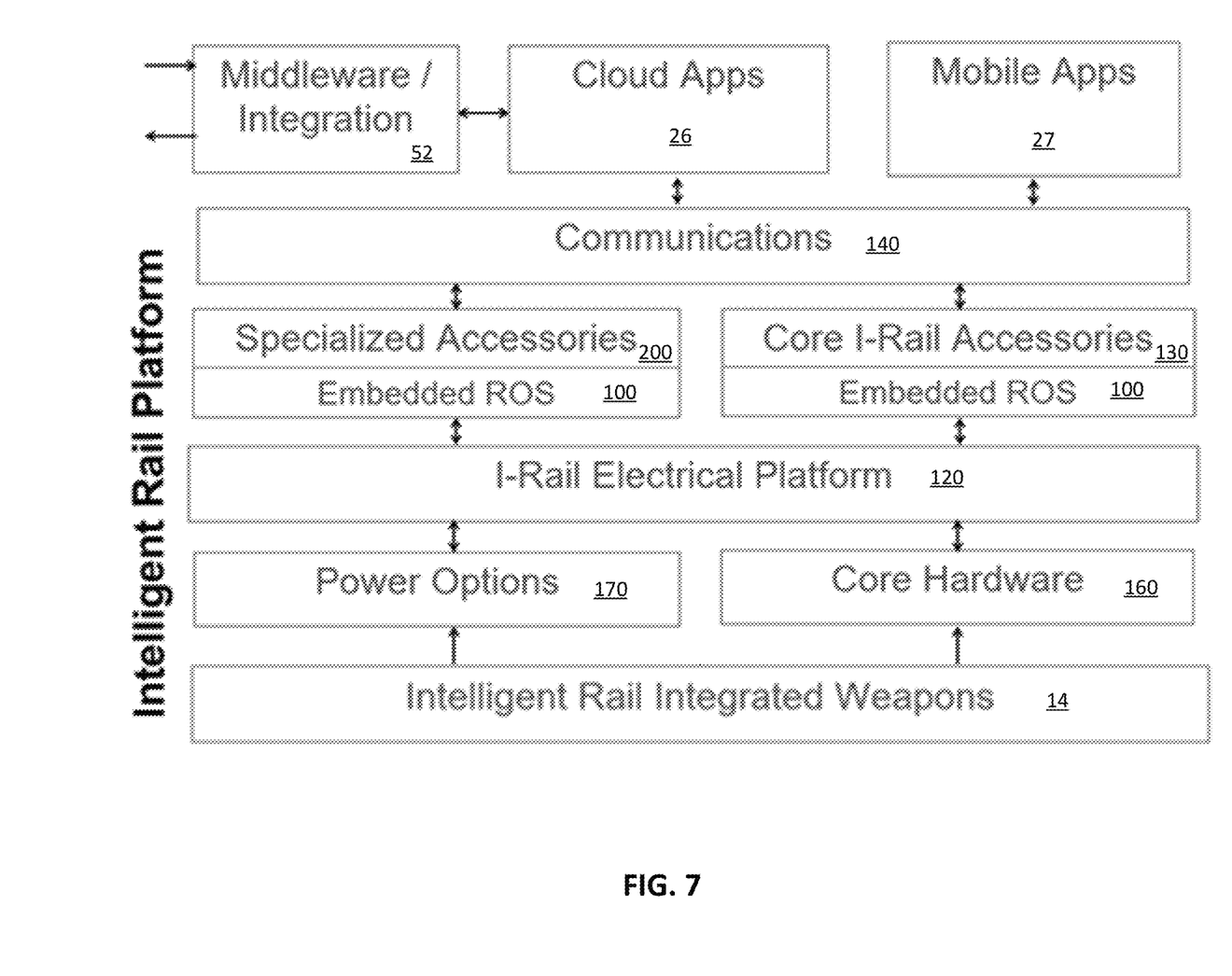
FIG. 7 schematically illustrates a platform for a device integrated with the ROS.

FIG. 7 schematically illustrates a platform for a firearm 14 integrated with the ROS 100. As shown in FIG. 7, the firearm 14 includes an electrical power source 170, core hardware components 160, and the electrified rail 120. Further, core accessories 130 that are embedded with the ROS 100 and tactical devices 200 that are embedded with the ROS 100 are attached to the electrified rail 120. Additionally, the communications gateway 140 is attached to the electrified rail 120 and is configured to transmit data from the core accessories 130 and the tactical devices 200 to applications on the cloud platform 26 and/or applications on the mobile platform 27. A middleware/integration module 52 provides data transformation and input/output from the cloud platform 26 and/or mobile platform 27 for use by entities such as the military, research and development teams, law enforcement, and public safety entities (see FIG. 2).

Figure 8:
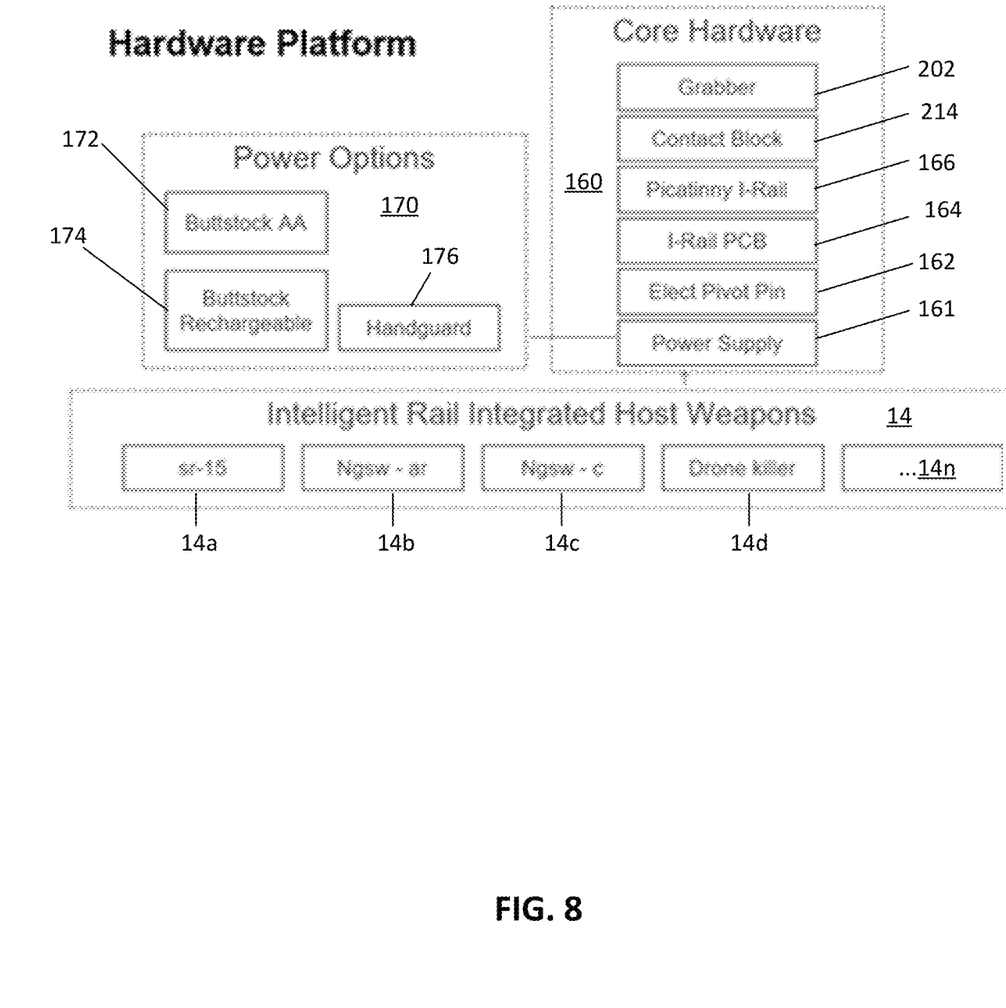
FIG. 8 schematically illustrates power options and core hardware for the ROS.

FIG. 8 illustrates the electrical power source 170 and the core hardware components 160 for the firearm 14 integrated with the ROS 100. The electrical power source 170 can include AA batteries 172 or rechargeable batteries 174 mounted in the buttstock of the firearm 14 similar to the arrangement disclosed in U.S. patent application Ser. No. 15/980,524, filed on May 15, 2018, the entirety of which is hereby incorporated by reference. Alternatively, the electrical power source 170 may include a handguard mounted power module 176. In this alternative, the handguard mounted power module 176 may include AA batteries or rechargeable batteries.

As shown in FIG. 8, the electrical power source 170 provides a power supply 161 for the core hardware components 160 which include the 2-wire rail bus 164 and an optional electrical pivot pin 162. Additionally, the core hardware components 160 include the Picatinny rail 166, and the rail grabber 202 and a contact block 214 of the tactical device 200 to mechanically and electrically connect the tactical device 200 to the electrified rail 120.

FIG. 8 further shows the various types of firearms 14a-14n on which the electrified rail 120 and ROS 100 can be utilized. For example, the electrified rail 120 and ROS 100 are adaptable for use on a Knight's Armament SR-15 14a, Next Generation Squad Weapon (NGSW) Assault Rifle (AR) 14b, NGSW-C 14c, drone killer 14d, and other similar types of weapons 14n. In addition to the firearms 14a-14n, the ROS 100 can also be utilized for other weapons including both military and non-military firearms, rifles, and handguns. Additionally, the ROS 100 can be used on additional devices having a powered rail including drones, robots, and other types of unmanned vehicles that can be equipped with or without a weapon system.

Figure 9:
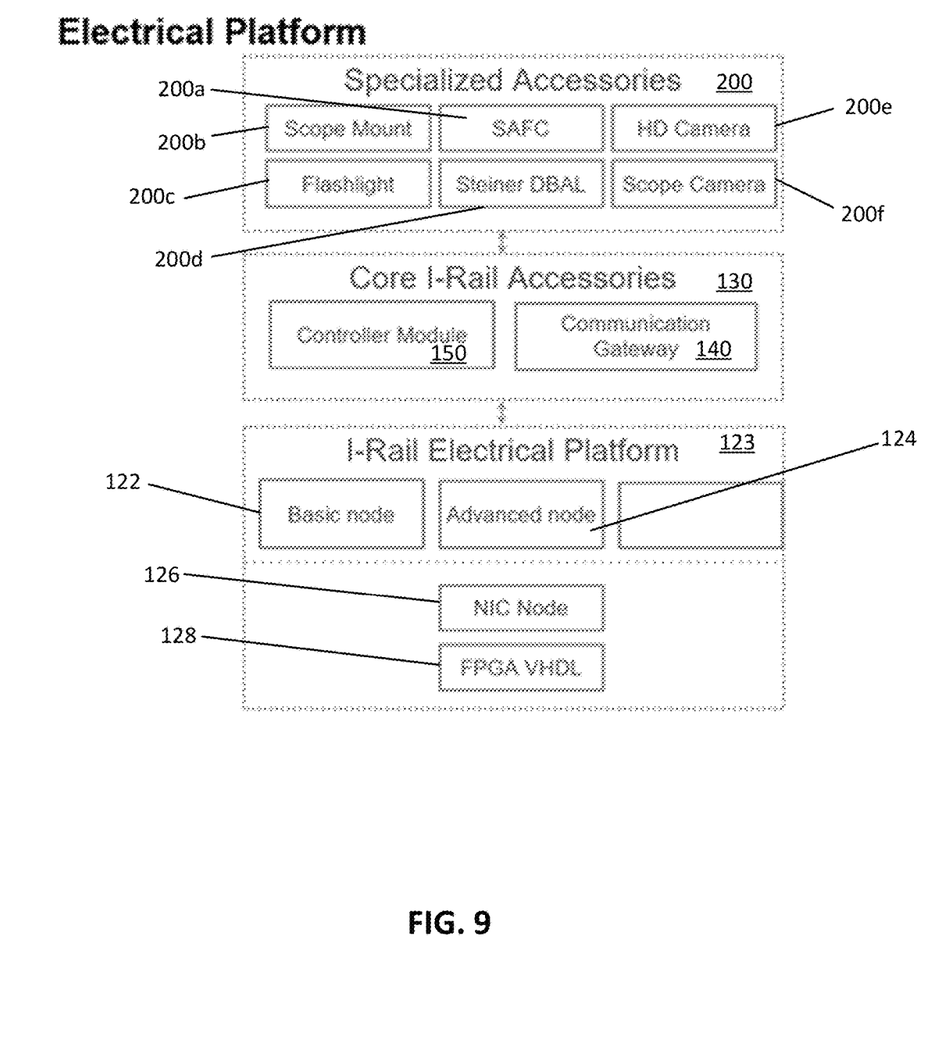
FIG. 9 schematically illustrates an electrical platform integrated with the ROS.

FIG. 9 schematically illustrates an electrical platform for the firearm integrated with ROS 100. As shown, an electrical platform 123 includes a field-programmable gate array (FPGA) 128 that is configured using a hardware description language (VHDL) to communicate with integrated circuitry that provides a standard networking interface and is similar to a network interface card (NIC) node 126 on a core accessory 130. The FPGA 128 enables Ethernet over power line communications on the electrified rail 120 which uses the 2-wire rail bus 164 that is modulated with power instead of a typical eight wire point to point connection. The Ethernet over power reduces complexity for demanding military and commercial field applications and enables interoperability between core accessories 130, tactical devices 200, and the gateway. Manchester encoding is used on the 2-wire rail bus 164 for encoding the Ethernet over power.

As further shown in FIG. 9, the electrical platform 123 includes a basic node 122 which is a low-power device that handles input/output, actuator control, and computations. The electrical platform 123 also includes an advanced node 124 which is a high-power device that handle more complex functions such as video encoding and IP routing. In one example, the communications gateway 140 in the core accessories 130 is an advanced node 124. In one example, the controller module 150 in the core accessories 130 is a basic node 122.

As further shown in FIG. 9, the core accessories 130 integrated with the ROS 100 (see FIG. 7) include the communications gateway 140 and the controller module 150. As described above, the communications gateway 140 processes and transmits the data 16 collected from the tactical devices 200 to the mobile device 20. The controller module 150 interoperates the tactical devices 200 on the electrified rail 120 by sharing the data between the tactical devices 200. The communications gateway 140 utilizes a communication protocol to reliably and securely share the data between tactical devices 200 on the electrified rail 120.

The controller module 150 provides a simple interface that may include one or more controls for controlling the operation of the tactical devices 200 attached to the electrified rail. For example, the controller module 150 may include one or more push buttons that active switches such the on/off switch of a flashlight tactical device. The controller module 150 is programmable and configurable allowing new modes of operation and types of accessories.

As further shown in FIG. 9, the tactical devices 200 integrated with the ROS 100 (see FIG. 7) are specialized accessories that each provide a unique functionality on the firearm 14. Examples of the tactical devices 200 integrated with the ROS 100 include a small arm firearm control (SAFC) 200a, scope mount 200b, flashlight 200c, dual beam aiming laser (DBAL) 200d, high definition (HD) camera 200e, scope camera 200f, and the like. Additional tactical devices may also be integrated with the ROS 100 and the foregoing list is not meant to be limiting.

Figure 10:
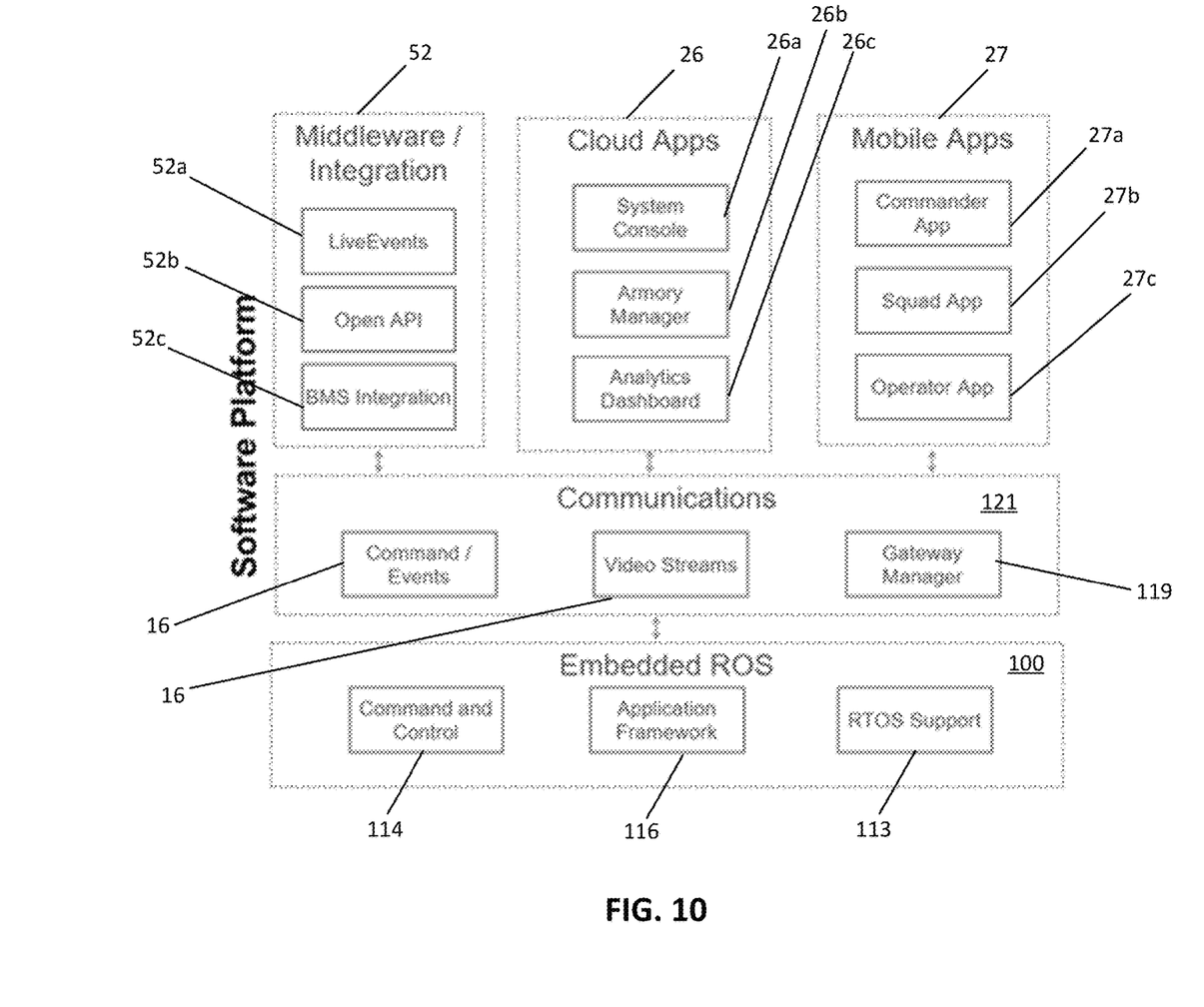
FIG. 10 schematically illustrates a software platform for the ROS.

FIG. 10 schematically illustrates a software platform for the ROS 100. In this example, the ROS 100 is embedded in the tactical devices 200 and core accessories 130 attached to the electrified rail 120. The ROS 100 includes the ROS application framework 116 which is an overall skeletal structural for organizing and calling the application programming interfaces (APIs) defined in the ROS core command and control 114, and for communicating with the RTOS driver 112 (see FIG. 4). Thus, the ROS 100 includes rich application API and skeleton code allowing for rapid application development, and that provides fast and efficient messaging between nodes, pub/sub, persistence, configuration, and security. The ROS 100 further includes an RTOS support module 113 that supports the ROS core command and control 114, the ROS application framework 116, and the RTOS driver 112.

The ROS 100 enables a firearm to transmit the data 16 to the command servers 30, 40 and to receive data from the command servers 30, 40 that can be used by one or more applications 106 on the firearm (see FIG. 3). For example, the ROS 100 enables the firearm to transmit the data 16 from the firearm including commands, events, and video streams via a data communications module 121. The data communications module 121 enables event and stream based data transport between locations within a field of operation such as a battlefield or between the battlefield and cloud endpoints. The data communications module 121 includes a gateway manager module 119 that provides store and forward and shadowing allowing a firearm 14 that includes the electrified rail 120 embedded with the ROS 100 to have offline capabilities with the command servers 30, 40 operated by entities 28 (see FIGS. 2 and 3).

As further shown in FIG. 10, applications on the mobile platform 27 include, without limitation, a commander application 27a, a squad application 27b, and an operator application 27c. The commander application 27a provides a view, analytics, and event history of all of the ROS 100 enabled firearms and allows remote operation. The squad application 27b provides remote commands, video, and event viewing bypassing cloud infrastructure. The operator application 27c provides SPOT report and NetWarrior plugin providing for level-up on battlefield SA. The operator application 27c also provides WiFi Direct tether for secure field configuration, data display and sometimes a networking bridge.

As further shown in FIG. 10, applications on the cloud platform 26 include, without limitation, a system console 26a, an armory manager application 26b, and an analytics dashboard application 26c. The system console 26a is a management console that provides real-time event and data viewing, remote and local configuration setting, log viewing, platform monitoring/debugging, and the ability to send remote commands from anywhere in the world that has security credentials and access to the system. The armory manager application 26b is an application for setting up and managing weapons including day 0 provisioning, operator pairing, security and key management, and local and remote configuration. The analytics dashboard application 26c provides visualizations of the data collected from the field of operation. In one example, the armory manager application 26b and the analytics dashboard application 26c are applications within the system console 26a.

As further shown in FIG. 10, a middleware/integration module 52 includes a live events manager 52a, an open AP1 manager 52b, and a Battle Management System (BMS) integration manager 52c. The live events manager 52a provides logic, rules, inference, and machine learning, that allows the system to act on ROS events individually or as part of a connected system of events that cascades notifications and initiates workflows. The open AP1 manager 52b provides application and system endpoints allowing future programmability and integration. The BMS integration manager 52c provides integration with command and control software that can provide detailed military situational awareness.

The ROS 100 provides the ability to send commands and receive events from a plurality of firearms 14 in a field of operation 10 such as a battlefield, and to cascade the events into actions internal to the ROS 100 or external to other linked systems.

Figure 11:
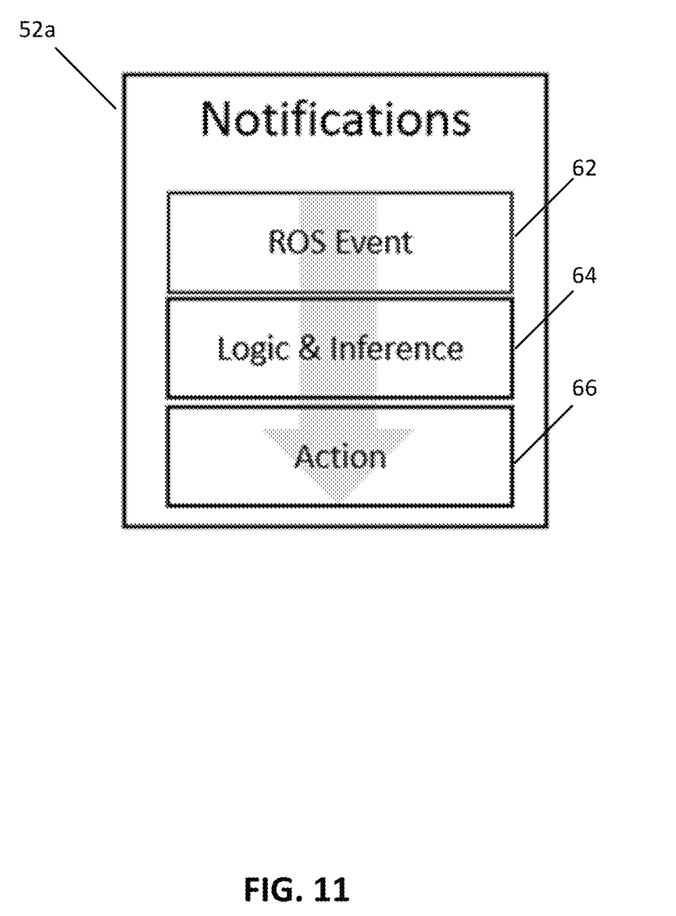
FIG. 11 schematically illustrates a live events manager of the software platform.

FIG. 11 schematically illustrates the live events manager 52a. As shown in FIG. 11, the live events manager 52a includes a first step 62 that receives a data event from a firearm. As described above, the firearm can include the communications gateway and at least one tactical device connected to the electrified rail having the electrical power source.

Next, the live events manager 52a includes a second step 64 that determines whether the event triggers a workflow. The second step 64 in the live events manager 52a can include logic, rules, inference, and machine learning, to determine if the event triggers a workflow.

Thereafter, the live events manager 52a includes a third step 66 that executes an action in response to the workflow being triggered. In one example, the action includes receiving positional, image, or video data from the at least one tactical device for display on a console.

In a further example, the action includes receiving a position changed event from one or more firearms and by way of applying logic, rules, inference, and machine learning to determine a threat state change. The threat state change initiates a workflow that may include monitoring other riles for similar changes, or notifying a commander application, or a third party system such as a Battle Management System (BMS).

In another example, the action includes receiving data from the at least one tactical device for storage on a remote system.

Figure 12:
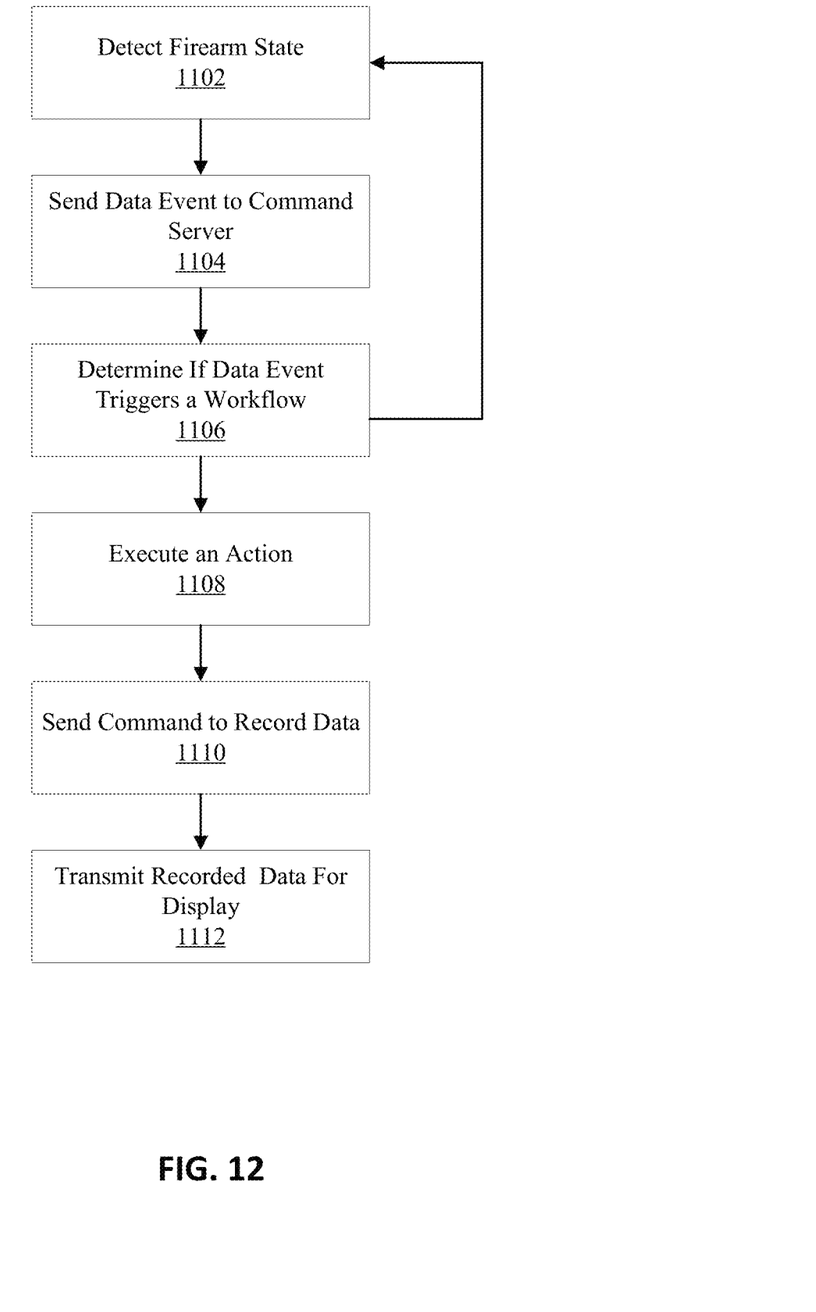
FIG. 12 illustrates an example method performed by the ROS.

FIG. 12 illustrates an example method 1100 performed by the ROS 100. In this example, a trained personnel is armed with a firearm embedded with the ROS 100. The trained personnel is present in a tactical environment such as the field of operation shown in FIG. 1. The position of the firearm implies a threat state, whether perceived or actual. For example, a relaxed firearm position occurs when the firearm is holstered or pointing vertically down, and indicates that the trained personnel is not in conflict. In contrast, an active firearm position occurs when the firearm is de-holstered, or pointing horizontally, and indicates the trained personnel is in, or contemplates, conflict.

In step 1102, the ROS 100 detects a change in threat state from a relaxed firearm position to an active firearm position, or from an active firearm position to a relaxed firearm position, using one or more sensors from the tactical device 200 or a core accessory 130.

In response to the ROS 100 detecting a change in threat state, in step 1104 the ROS 100 records the data event locally and sends the data event through the communications gateway 140 to the mobile device 20 (see FIG. 5) for transmittal across the data communications network 118 to one or more command servers 30, 40 (see FIG. 3). As described above, the data communications network 118 includes a cellular network or similar network. In alternative methods, the ROS 100 records the data event locally and directly sends the data event through the communications gateway 140 to the one or more command servers 30, 40 without using the mobile device 20 for transmitting the data across the data communications network.

Next, in step 1106 the ROS 100 applies logic, rules, inference, and machine learning algorithms to determine if the data event triggers a workflow. If the data event does not trigger a workflow, the method 1100 terminates or is repeated to detect another change in threat state. In some examples, the logic, rules, inference, and machine learning algorithms are stored in a memory of a processing core of the command servers 30, 40.

If the data event does trigger a workflow, the method 1100 in step 1108 executes one or more actions. An action can include one or more programmable system actions such as making a system to system API call to update a shared display. Also, an action can include receiving positional, image, or video data from at least one tactical device on the firearm for display on the console. Events can include data indicating that a shot has been fired from the firearm, including receiving positional, image, or video data from the firearm, and also including receiving data indicating a quantity, location, and direction of shots fired. In another example, the action can include receiving data from the firearm for storage on a remote system.

The ROS 100 enables one or more entities 28 (see FIG. 2) to assess the new situational context and subsequently use the ROS 100 to send a command to the firearm. In an example where an action includes sending a command to the firearm to record data, the method 1100 can include a step 1110 of sending a command to record data from a specialized tactical device 200 mounted on the firearm. The command is sent by the ROS 100 through the processing core of the command server 30, 40, across the data communications network 118, and to the communications gateway 140 on the firearm to turn on the video camera.

Next, in step 1112 the ROS 100 transmits the recorded data back through the communications gateway 140, and through the data communications network 118 to the processing core of the command server 30, 40, for displaying the recorded data on the console.

The ROS 100 is not limited to any specific states, such as the threat state described above. An infinite number of states can be handled by the ROS 100 based on the sensors present on the tactical devices 200 and core accessories 130. For example, the ROS 100 may handle additional states including a discharged state which is detected when the firearm discharges a round of ammunition. In this example, the discharged state triggers a "shot fired" event.

The ROS 100 is also not limited by any specific data events. An infinite number of data events can be handed by the ROS 100 based on the states detected from the firearm. The ROS 100 is also not limited to any specific action. An infinite number of actions can be handled by the ROS 100. The ROS 100 also is not limited to any specific commands. An infinite number of commands can be programmed based upon the tactical devices attached to the firearm.

In accordance with the foregoing disclosure, the ROS 100 is an application development framework for building and/or adapting tactical devices and accessories to work on the ROS Platform and the electrified rail 120. Multiple commands can be sent to configure tactical devices mounted to the firearm, to query maintenance related data such as numbers of shots fired, to retrieve the azimuth of the firearm, or its location.

The various embodiments described above are provided by way of illustration only and should not be construed to limit the claims attached hereto. Those skilled in the art will readily recognize various modifications and changes that may be made without following the example embodiments and application illustrated and described herein, and without departing from the true spirit and scope of the following claims.

What is claimed is:

1. A system for interoperating and communicating data from a firearm, the system comprising:
    an electrified rail mounted on the firearm, the electrified rail providing electrical power and Ethernet over power line communications;
    an accessory device connected to the electrified rail, the accessory device sharing data across the electrified rail using the Ethernet over power line communications, the accessory device including a network interface card embedded with a rail operating system that includes an application programming interface that defines a framework for organizing and calling the application programming interface, the accessory device configured to:
        receive an event in a communication across the electrified rail from at least one other device connected to the electrified rail;
        determine that the event triggers a workflow when the event indicates a change in a status of the firearm; and
        execute an action on the firearm in response to the change in the status.

2. The system of claim 1, wherein the action includes transmitting positional, image, or video data from the accessory device.

3. The system of claim 1, wherein the action includes transmitting data indicating that a shot has been fired from the firearm.

4. The system of claim 3, wherein the action further includes transmitting positional, image, or video data from the accessory device.

5. The system of claim 4, wherein the action further includes transmitting data indicating a quantity, location, and direction of shots fired.

6. The system of claim 1, wherein the action includes transmitting data from the accessory device for storage on a remote system.

7. The system of claim 1, wherein the system is configured to interoperate with the accessory device connected to the electrified rail.

8. The system of claim 7, wherein the system is further configured to interoperate the accessory device with a remote server.

9. The system of claim 1, wherein the status is a threat state.

10. The system of claim 1, wherein the change in the status includes a change from a relaxed firearm position to an active firearm position.

11. The system of claim 10, wherein the relaxed firearm position is when the firearm is pointing vertically, and the active firearm position is when the firearm is pointing horizontally.

12. The system of claim 1, wherein the Ethernet over power line communications is encoded on the electrified rail using Manchester encoding.

13. The system of claim 1, wherein the Ethernet over power line communications provides remote operation of the accessory device by one or more remote servers.

14. The system of claim 1, wherein the action includes recording the event locally on the firearm.

15. The system of claim 1, wherein the action includes a store and forward operation for communications with a remote server.

16. The system of claim 1, wherein the network interface card framework enables publish and subscribe messaging between accessory devices.

17. The system of claim 1, wherein the accessory device is a tactical device.

* * * * *